March 29, 1966  A. E. HANDLOS ETAL  3,243,268
MIXING PHASES CONTINUOUSLY WITH CONTROL OF PHASE RATIO
Original Filed Dec. 17, 1959

INVENTORS:
ARTHUR E. HANDLOS
JAMES L. RALPH
BY: Oswald T. Milmore
THEIR ATTORNEY

United States Patent Office

3,243,268
Patented Mar. 29, 1966

---

3,243,268
MIXING PHASES CONTINUOUSLY WITH CONTROL OF PHASE RATIO
Arthur E. Handlos, Albany, and James L. Ralph, Oakland, Calif., assignors to Shell Oil Company, New York, N.Y., a corporation of Delaware
Continuation of application Ser. No. 860,274, Dec. 17, 1959. This application May 18, 1964, Ser. No. 390,245
2 Claims. (Cl. 23—309)

This is a continuation of an application Serial No. 860,274, filed Dec. 17, 1959, now abandoned.

The invention relates to a method and apparatus for mixing at least partially immiscible liquid phases having different densities within a confined mixing zone from which the resulting mixture is discharged continuously. Such mixing may be for the purpose of effecting a chemical reaction, e.g., alkylation of hydrocarbons by effecting contact thereof with sulfuric acid, or to produce some physical effect, e.g., the extraction of a component of a liquid solution with a selective solvent. The term "mixer" is used herein to include devices for any such purpose.

In mixing operations it is frequently desirable to control the ratio between the liquid phases within the mixer independently of the normal ratio. The term "normal ratio" is used herein to denote the ratio in which the phases would be discharged from the mixer after continuous operation at constant conditions for a sufficient period to attain equilibrium; it is the ratio of the phases resulting from the mixing. This normal ratio is close to the ratio which would prevail within the mixer if perfect mixing occurred. This may or may not be the same as the ratio between the feeds to the mixer, depending upon the solubility or mass-transfer characteristics of the fluids and changes in their volumes due to chemical reactions. The over-all phase ratio prevailing within the mixer often influences the process carried out therein, such as the mass transfer between phases and, in chemical reactions, the conversion and/or yield.

The over-all phase ratio which prevails within a mixer is not necessarily reflected in either the inlet or the outlet conditions, due to the fact that the mixture produced within the vessel is not uniform. Thus, the degree of mixing may be insufficient to produce a uniform phase ratio, and/or partial segregation of the phases may occur by gravity settling or by inertial effects due to vortex action or change in flow direction of the mixture within the mixer. As a consequence the composition of the mixture discharged is not representative of the over-all composition within the mixer.

For example, with a particular mixer comprising an impeller rotated about a vertical axis within an unbaffled vessel to which kerosene and water were supplied continuously and discharged, both in the volumetric ratio of 61:39, it was found that the local ratio between these phases within the vessel varied from 11:89 to close to the normal ratio in accordance with the rotor speed. For a second example, in a reactor of the type described hereinafter as the third embodiment, the volumetric ratio of hydrocarbon to acid at the inlets was 8.2:1 and the normal ratio, at the outlet, was slightly less due to absorption of a part of the hydrocarbons in the acid phase; the over-all volumetric ratio prevailing within the reactor itself was, however, found to be 0.7:1, showing a considerably greater hold-up of acid.

In neither of these two examples does the operator have control over the prevailing phase ratio within the mixer, save for the small and sometimes unpredictable effects of changing the speed of rotation of the agitator. The consequences of a change in agitator speed, moreover, may be undesirable, as when it effects a decrease in mass transfer or an increase in emulsification with subsequent difficulty in settling. The prevailing phase ratio can, of course, be altered by changing the ratio between the feed streams and, thereby, the normal ratio; however, these are usually fixed by other considerations and are not subject to arbitrary alteration by the operator.

The desirability of controlling the prevailing phase ratio in the mixer independently of the normal ratio has been recognized and one proposal has been to recycle to the mixer a part of the effluent after complete or partial settling; such an approach is described in the French Patent No. 1,147,136. This has the drawback requiring external settlers and recycle pumps or other flow-inducing elements in addition to appurtenant control elements.

It is the object of the invention to provide an improved method and apparatus for controlling the prevailing phase ratio within the mixing vessel independently of the normal ratio, without the necessity of recycling a part of the discharged mixture.

This object is attained according to the invention by admitting feeds continuously to a mixing zone at rates to form fluent phases therein in a normal ratio, mixing said phases to form a mixture which contains said phases in different local ratios at different regions of the said zone, continuously discharging the mixture from said zone, and controlling the composition of the discharged mixture to bring the phase ratio therein temporarily to a value different from the said normal ratio by varying the effective location from which the mixture is discharged. The "effective discharge point" is that point located within the mixing vessel whereat the ratio between the phases is the same as the effluent ratio, i.e., the ratio at any instant in all of effluent stream or streams. Because the phase ratio is different at different locations within said vessel, any change in the location of the effective discharge point —whether real or virtual—causes a temporary change in the effluent ratio or composition. After such a controlled change in the effluent phase ratio, the inventory of one of the phases within the mixing zone gradually increases at the expense of the other, with a concomitant change in the composition of the discharged mixture (assuming the said effective location of the discharge point to be held constant) until the normal phase ratio prevails in the latter. Thereafter the mixer continues to operate with increased hold-up of the said one phase, i.e., with a higher over-all ratio of that phase to the other phase or phases. In this manner the over-all phase ratio within the mixing zone is controlled independently of the normal ratio, and without either altering the ratio of the feed streams or recycling material.

In other words, according to the invention the non-uniformity in local phase ratio at different regions of the vessel is utilized to achieve a control of the over-all phase ratio within the mixer. The nature of such non-uniformity will vary among mixers and even in one mixer if operated at different agitator speeds. Most mixers have some inherent non-uniformity in phase ratios and it is rare that the contents of a mixer are so thoroughly mixed that there are not regions within the mixing zone which differ with respect to the ratio of phases from other regions. Even in a simple vessel containing only an agitator or impeller a certain amount of settling by gravity or segregation due to centrifugal action is commonly encountered; this tendency can be enhanced, if necessary, by arranging the agitator to operate with less intensity at certain regions, e.g., by omitting the agitator paddles or blades from such regions and/or by providing baffles which define zones of reduced turbulence. Non-uniformity in phase ratio is almost unavoidable when the mixing vessel is provided with walls or baffles which define flow channels for the mixture, and is more pronounced when such channels are shaped to induce sharp changes in flow direction. Both in the case of unbaffled vortical or centrifugal flow and the case of flow through channels with changes in direction, the phases are partially segregated, the denser one being concentrated at the outer side of the flow path and the other at the inner side.

The above-mentioned variation in the effective location of the discharge point can be achieved in several ways, e.g., by a virtual or an actual change in the location. For example, the mixer can be provided with a branched discharge duct whereof the branches are in flow-receiving communication with different regions of the mixing zone, preferably regions whereat extremes of variation in local phase ratio occur, and the ratio between the fractional flows through these branches is controlled to produce a composite effluent having a phase ratio corresponding to that prevailing within either of these regions or to any intermediate composition. Because there is a gradient of the local phase ratio within the mixing zone between these regions, there will be a point at which the local phase ratio is the same as that of the said composite effluent, and this is the effective and virtual discharge point. It is, however, in some instances also possible to change the actual discharge point along a local phase ratio gradient between the said regions, e.g., by providing a discharge duct having an intake in flow-receiving communication with the mixing zone which intake can be moved physically, as by an axially slidable or a swiveled mounting. The location of the said intake is then the effective and real discharge point.

It is, of course, not to be inferred that complete separation between the phases occurs in the mixer, or that clear and settled phases shall prevail in the said regions within the mixing zone. Instead, a mixture of phases occurs within each said region. Moreover, there is no control of the over-all phase ratio by controlling the interface level between phases either within the mixing zone or a settler associated therewith; nor is the average density of the over-all mixture in the mixer controlled directly by control of the agitator speed. Such a scheme is employed in certain contacting devices, such as the rotating disc contactor described by Reman in U.S. Patent No. 2,601,674, wherein the holdup is determined either as a function of the rotor speed or of an interface level maintained within a settling chamber within or external to the contacting column.

Having indicated the general nature of the invention, reference is made to the accompanying drawing forming a part of this specification and showing three preferred and illustrative embodiments, wherein.

Figure 1:
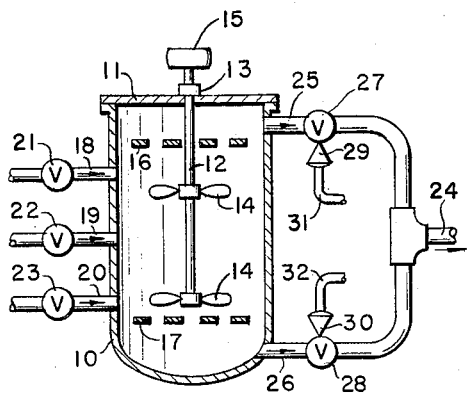
FIGURE 1 is a diagrammatic vertical sectional view through one embodiment of the mixer, wherein regional differences in local phase ratio are caused by gravitational settling and branched discharge ducts are used to change the virtual discharge point.

Referring to FIGURE 1, the mixing vessel 10, fitted with a top closure 11, defines a mixing zone or chamber and contains an agitator, e.g., a shaft 12 which is mounted in a bearing 13, carries a plurality of impeller blades 14, and is rotated by a belt (not shown) via pulley 15. The vessel is optionally divided by transverse baffle means 16, 17, such as screens or grid bars which provide large openings for free intercommunication, the said baffle means defining top and bottom regions of the mixing zone which are partially isolated from the intermediate region containing the impeller blades. The vessel has a plurality, e.g., three inlets 18–20, each having flow-control means such as throttle valves 21–23, for admitting in predetermined ratio the fluids which form the phases to be mixed; these fluids may be the phases themselves or the phases may be formed within the vessel by chemical reaction. The outlet duct 24 has a plurality, e.g., two branches 25, 26, which have their intakes in flow-receiving communication respectively with the upper and lower end regions above and below the baffles means 16, 17. These branch ducts have individual flow-control means, such as throttle valves 27 and 28, which may be provided with valve-positioners 29 and 30 for actuation from a remote control station by a control fluid such as air, supplied at an adjustable pressure by control lines 31 and 32.

In operation, the fluid to be mixed, e.g., mercaptan-bearing gasoline, concentrated aqueous caustic soda, and water are admitted continuously via the inlets 18–20 at such rates as to form a plurality, e.g., two liquid phases, consisting essentially of gasoline and diluted caustic containing dissolved mercaptans, of relatively lower and higher density and herein, for convenience, called the A and B phases, respectively. The shaft 12 and impeller blades 14 are rotated to produce an intimate mixture of the phases in the vessel. The resulting dispersion is, however, not uniform within the vessel inasmuch as some settling occurs. Settling is especially pronounced within the end zones beyond the baffle means 16 and 17 when these are provided. As a consequence the part of the mixture within the upper end zone, at the left of the intake to branch duct 25, contains a higher local ratio of phase A to phase B than that prevailing in the part of the mixture within the lower end zone, at the level of the intake to branch duct 26; the over-all phase ratio in the vessel as a whole lies intermediate to these extreme local phase ratios. The composition of the mixture discharged through the duct 24 can, therefore, be controlled and made equal to either of these end-zone compositions or to any intermediate value by adjusting the valves 27 and 28 to effect a desired proportioning of the branch streams and thereby fix the virtual discharge point.

When the control of the composite effluent stream phase ratio is such that the laid ratio differs from the normal phase ratio, there will be a progressive change in the over-all phase ratio within the mixing vessel. For example, if the phase ratio in the composite effluent is higher than the normal ratio, the inventory of the heavier phase B will increase progressively throughout the vessel. When the virtual discharge point is unchanged, i.e., when the settings of the valves 27 and 28 are not altered and the agitator speed is not changed, the phase ratio in the composite effluent thereby approaches the normal ratio. After it attains this ratio the mixer continues to operate with a new over-all ratio of phases while the effluent continues at the normal ratio.

The particular relation between the extreme phase ratios in the draw-off regions and the over-all phase ratio will, of course, depend upon the nature of the variations in any particular mixer, influenced in turn by the agitator speed, design, and the presence of baffles.

The exact mechanism of this control may be better understood from the following numerical example, in which it is assumed that the feed streams are such as to produce phases A and B (relatively less dense and more dense, respectively) in a normal volumetric ratio of 20:80.

*Case I.—Approximately normal ratio within the vessel*

When the nature of the variation in local phase ratios is such that the ratio of phase A to phase B is 40:60 at the top and 10:90 at the bottom when the over-all ratio within the vessel is 20:80 (the normal value), this condition can be held steady by adjusting the valves 27 and 28 so that one-third of the total discharge stream flows through the upper branch duct 25 and two-thirds through the lower branch duct 26. The ratio in the total discharge stream is, in this case, 20:80. In general, the composition of the total discharge stream is given by the formula $$C_a = XU_a + (1-X)L_a$$

wherein $C_a$ is the fractional content of the phase A in the total discharge stream, $U_a$ and $L_a$ the fractional contents of the phase A in the upper and lower branch ducts, respectively, and X is the fraction of the total discharge stream which flows via the upper branch duct. It is evident that, in this example, the normal value of $C_a$ is 0.20.

*Case II.—Higher than normal ratio within the vessel*

When the mixer is operating as described in Case I and the valves 27 and 28 are adjusted so that X equals one-eleventh, the value of $C_a$ in the total discharge stream falls initially to about 0.127 (considerably below the normal value of 0.20), thereby bringing about an increase in the hold-up of phase A within the vessel; this brings about a progressive rise in $U_a$, $L_a$ and in the over-all ratio, and in $C_a$, until $C_a$ is again equal to the normal value of 0.20. Thereafter, $C_a$ remains at 0.20. The exact values of these three ratios will depend upon the nature of the variations in local phase ratios. One exemplary distribution is: $U_a = 0:60$, $L_a = 0.16$, and the over-all phase ratio within the vessel is 32:68. In a mixer wherein the greater variations in composition occur, these quantities may be: $U_a = 0:70$, $L_a = 0:15$, and the over-all phase ratio within the vessel is 34:66.

*Case III.—Lower than normal ratio within the vessel*

When the mixer is operating as described in Case I and the valves 27 and 28 are adjusted so that X equals eight-tenths, the value of $C_a$ rises initially to 0.34, thereby effecting a decrease in the hold-up of phase A and a progressive decrease in $U_a$, $L_a$ and the over-all ratio, until $C_a$ again attains and maintains the normal value of 0.20. In one exemplary distribution of variations in local phase ratios, the final values are: $U_a = 0.22$, $L_a = 0.12$, and over-all phase ratio within the vessel is 17:83; with more pronounced variations in local phase ratios, these values may be: $U_a = 0.24$, $L_a = 0.04$, and the over-all phase ratio 10:90.

It is evident that when the variation in local phase ratio is more pronounced, it is possible to bring the over-all phase ratio within the vessel farther from the normal ratio with any given setting of the valves 27 and 28. These variations can be made more pronounced by the use of baffles or other means which promote segregation of phases and/or reduce mixing intensity within certain regions, as will be shown further in connection with a subsequent embodiment.

Figure 3:
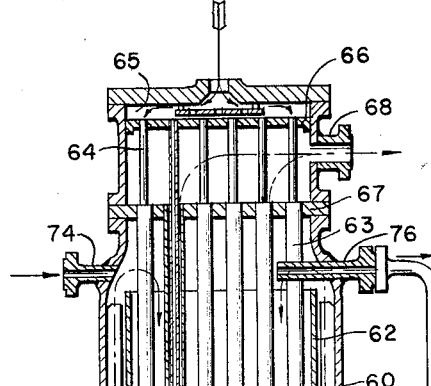
FIGURE 3 is a plan view of the mixer shown in FIGURE 2.
Figure 3:
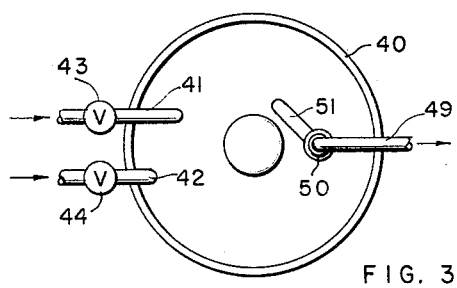
Figure 2:
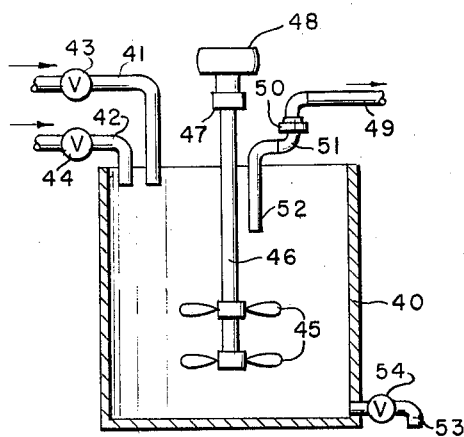
FIGURE 2 is a vertical sectional view of a second embodiment of the mixer, wherein variations in local phase ratio are effected by centrifugal action and a discharge duct with a movable intake is provided to vary the physical location of the real discharge point.

A change in the effective point from which the composite mixture is drawn off can, in certain embodiments, be attained by physically moving the location of the discharge point along a gradient of phase ratios, either vertically or horizontally. Such an embodiment is illustrated in FIGURES 2 and 3, the mixer comprises a vessel 40 having a plurality of inlet pipes 41, 42, each controlled by a valve 43, 44, for admitting the feed streams in controlled ratio. It is provided with agitators 45, mounted for rotation with a vertical shaft 46 having a bearing support 47 and drive means, such as a pulley 48. The discharge duct 49 is connected by a swivel 50 to a horizontally swingable pipe 51 having a down-turned intake section 52 the open end of which is immersed in the mixture with the vessel. It is evident that by pivoting the pipe 51 about its vertical axis in the swivel, which is situated eccentrically to the vessel, it can be positioned to different radial distances from the vessel wall. A drain pipe 53, normally closed by a valve 54, permits the tank to be emptied.

In operation, the materials to be contacted are supplied via the pipes 41 and 42 at controlled rates to form two phases of different densities, which are mixed by the agitators 45. This results in intimate mixing; however, the resultant mixture forms a vortex about the central axis of the vessel, tending to concentrate the relatively denser phase near the vessel wall and other phase near the axis. The composition of the mixture drawn off can, therefore, be controlled by adjusting the radial position of the pipe section 52. The principles of operation are otherwise as described above.

Figure 4:
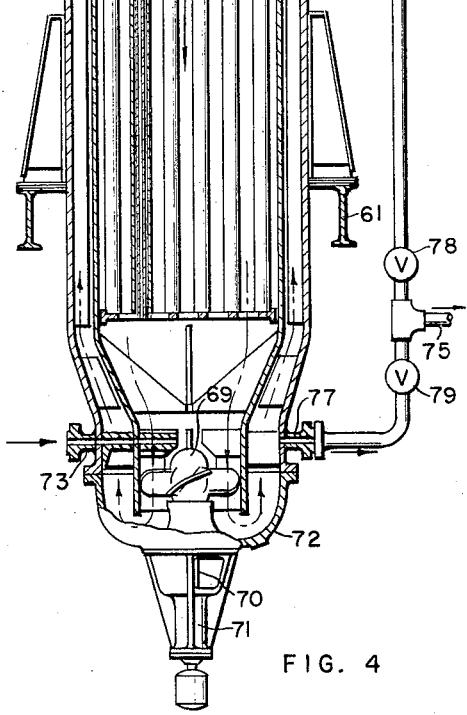
FIGURE 4 is a vertical sectional view of a third embodiment of the mixer, wherein regional differences in local phase ratio are caused by flow through a confined flow channel and branched discharge ducts are used.

Referring to FIGURE 4, the invention may be applied to a reactor-mixer of the type used in the known alkylation process, wherein hydrocarbons and sulfuric acid are mixed. The mixer comprises an outer, upright shell 60 supported at 61 and containing a concentric, vertical draft tube 62 within which cooling tubes 63 may be mounted. Each said cooling tube contains a smaller, concentric tube 64 to which coolant is admitted from a coolant inlet chamber 65, above a tube sheet 66. The coolant emerges from the lower ends of the tubes 64, flows upwards through the annular space between the tubes 63 and 64 and are discharged from the former into the chamber between the tube sheets 66 and 67 and is discharged at 68. The bottom of the draft tube is of reduced section and contains a vaned impeller 69 which is driven by a shaft 70 journalled at 71 and rotated by a motor, not shown. The vessel wall beneath the bottom of the draft tube 62 is curved, as shown at 72, to define an annular, confined channel for the mixture, which is impelled downwards by the impeller and makes a change of direction before ascending through the channel. After reaching the top the mixture flows over the top edge of the draft tube and enters the same for downward flow to the impeller. The mixer is provided with a bottom inlet pipe 73 which terminates within the draft tube just above the impeller and a top inlet pipe 74 just above the top of the draft tube.

According to the invention the mixer is provided with a discharge duct 75 having branches 76 and 77 controlled by valves 78 and 79, respectively, and communicating respectively with different regions of the vessel whereat the local phase ratios in the mixture are different. As shown, these points are at the top of the draft tube 62 and the lower part of the annular up-flow passage. The volumetric ratio of lower-density to higher-density phases is relatively greater at the top of the draft tube than at the lower part of the annular passage, due principally to segregation of the heavy, aqueous acid phase from the hydrocarbon phase upon the sharp change in flow direction as the mixture enters the annular passage. However, this difference in local phase ratio may in part be attributed to sedimentation of the aqueous acid phase. As a consequence the branch duct 76 carries a mixture having a higher hydrocarbon-to-acid ratio than the mixture carried by the branch duct 77, whereby the composition can be controlled by setting the valves 78 and 79 in the manner described previously for the first embodiment.

We claim as our invention:
1. Method of continuously mixing a plurality of at least partially immiscible liquid phases having different densities in a mixing vessel into which phases are introduced; in a normal ratio, but the inventory of said phases in said vessel has an over-all ratio which is independent of said normal ratio, in which method the over-all ratio of said inventory is controlled to bring the over-all ratio to a desired value, which comprises the steps of:

(a) continuously admitting fluids into a confined mixing vessel and forming therein a plurality of liquid phases having said normal ratio;
    (b) mixing said phases within said vessel and forming therein a mixture of said phases which is not uniform but contains the said phases in different local ratios at different regions within the vessel, thereby establishing a local phase ratio gradient within said vessel;
(c) continuously discharging some of said mixture from said vessel through a single outlet stream emanating from a single discharge point located within said vessel;
(d) controlling the over-all ratio within said vessel independently of said normal ratio by physically moving said single discharge point to desired locations along said gradient, whereby the overall ratio in said vessel will assume a value related to the physical location of said discharge point.

2. Method of continuously mixing a plurality of at least partially immiscible liquid phases having different densities in a mixing vessel into which phases are introduced in a normal ratio, but the inventory of said phases in said vessel has an overall ratio which is independent of said normal ratio, in which method the overall ratio of said inventory is controlled to bring the overall ratio to a desired value, which comprises the steps of:
(a) continuously admitting the liquids into a confined mixing vessel;
(b) mixing said phases within the vessel and forming therein a mixture of said phases which is not uniform but contains the said phases in different local ratios at different regions within the vessel;
(c) continuously discharging some of said mixture from said vessel through a plurality of outlet streams emanating from said vessel at different regions of the vessel whereat the local phase ratios are greater and lower, respectively, than said normal ratio, the outlet streams all discharging to a common outlet duct; and
(d) controlling the overall ratio within said vessel independently of the normal ratio by varying the relative flows of the outlet streams.

References Cited by the Examiner
UNITED STATES PATENTS

| | | | |
|---|---|---|---|
| 853,575 | 5/1907 | Boileau | 23—309 X |
| 1,283,364 | 10/1918 | Trent | 23—271 X |
| 2,273,660 | 2/1942 | Poole | 196—14.52 X |
| 2,727,731 | 12/1955 | Martinek | 210—542 X |
| 2,804,379 | 8/1957 | Wistrich | 23—270.5 |
| 2,852,349 | 9/1958 | Hicks | 23—270.5 |
| 2,881,920 | 4/1959 | Simkin | 23—310 X |
| 2,902,413 | 9/1959 | Kassel | 23—270.5 X |
| 2,986,514 | 5/1961 | Akers | 196—14.52 X |

FOREIGN PATENTS 6,158    11/1903    Denmark.

NORMAN YUDOFF, *Primary Examiner.*

S. EMERY, *Assistant Examiner.*